(12) United States Patent
Horiuchi (10) Patent No.: US 12,172,470 B2
(45) Date of Patent: Dec. 24, 2024

(54) PNEUMATIC TIRE

(71) Applicant: The Yokohama Rubber Co., LTD., Tokyo (JP)

(72) Inventor: Kenji Horiuchi, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 699 days.

(21) Appl. No.: 16/968,539

(22) PCT Filed: Feb. 6, 2019

(86) PCT No.: PCT/JP2019/004130
§ 371 (c)(1),
(2) Date: Aug. 7, 2020

(87) PCT Pub. No.: WO2019/156095
PCT Pub. Date: Aug. 15, 2019

(65) Prior Publication Data
US 2021/0039441 A1 Feb. 11, 2021

(30) Foreign Application Priority Data
Feb. 7, 2018 (JP) .................... 2018-019936

(51) Int. Cl.
*B60C 11/12* (2006.01)
*B60C 11/03* (2006.01)
*B60C 11/13* (2006.01)

(52) U.S. Cl.
CPC ...... *B60C 11/0304* (2013.01); *B60C 11/0302* (2013.01); *B60C 11/0306* (2013.01);
(Continued)

(58) Field of Classification Search
CPC ............. B60C 11/1204; B60C 11/0304; B60C 11/1236; B60C 11/0302; B60C 11/0306;
(Continued)

(56) References Cited

U.S. PATENT DOCUMENTS 5,361,816 A * 11/1994 Hitzky .................... B60C 11/11
152/902
5,814,169 A 9/1998 Yamaguchi et al.
(Continued)

FOREIGN PATENT DOCUMENTS

JP S62-184903 8/1987
JP H04-349004 A 12/1992
(Continued)

OTHER PUBLICATIONS

International Search Report for International Application No. PCT/JP2019/004130 dated May 7, 2019, 4 pages, Japan.

*Primary Examiner* — Justin R Fischer
*Assistant Examiner* — Philip N Schwartz
(74) *Attorney, Agent, or Firm* — Thorpe North & Western (57) ABSTRACT

A tread pattern of a pneumatic tire includes circumferential main grooves, lug grooves and first and second sipes connecting the circumferential main grooves, a block land portion defined by the circumferential main grooves and the lug grooves and including the sipes. The lug grooves and the first and second sipes have a shape that projects toward one direction in the circumferential direction. A shallow depth groove raised bottom is provided in a turning portion where the lug groove includes a projecting apex. The projecting apex of a sipe turning portion including the projecting apex of the first sipe is within the range of the shallow depth groove raised bottom, and is inward in the lateral direction compared with the position of the projecting apex of a sipe turning portion including the projecting apex of the second sipe.

20 Claims, 5 Drawing Sheets

(52) U.S. Cl.
CPC ...... *B60C 11/1204* (2013.01); *B60C 11/1236* (2013.01); *B60C 11/1369* (2013.01); *B60C 2011/0367* (2013.01); *B60C 2011/0388* (2013.01)

(58) Field of Classification Search
CPC ................. B60C 11/12; B60C 11/1369; B60C 2011/0341; B60C 2011/0369; B60C 2011/0381; B60C 2011/0386; B60C 2011/0388; B60C 2011/0367
See application file for complete search history.

(56) References Cited

U.S. PATENT DOCUMENTS

| | | | | |
|---|---|---|---|---|
| 6,695,024 | B2 * | 2/2004 | Neugebauer | B60C 11/1369 152/902 |
| 2003/0019555 | A1 * | 1/2003 | Nakagawa | B60C 11/0302 152/DIG. 3 |
| 2012/0241061 | A1 | 9/2012 | Maehara | |
| 2013/0000805 | A1 * | 1/2013 | Oodaira | B60C 11/1263 152/209.1 |
| 2014/0345767 | A1 | 11/2014 | Tanaka et al. | |
| 2015/0251500 | A1 | 9/2015 | Pokutta-Paskaleva et al. | |
| 2015/0273951 | A1 | 10/2015 | Yamakawa | |
| 2016/0152084 | A1 * | 6/2016 | Murata | B60C 11/0306 152/209.8 |
| 2021/0061019 | A1 * | 3/2021 | Endo | B60C 11/1376 |

FOREIGN PATENT DOCUMENTS

| | | | | |
|---|---|---|---|---|
| JP | H08-104112 | | 4/1996 | |
| JP | 2004217058 A | * | 8/2004 | ............ B60C 11/11 |
| JP | 2009-227154 A | | 10/2009 | |
| JP | 2010126046 A | * | 6/2010 | ......... B60C 11/1369 |
| JP | 2012-201253 | | 10/2012 | |
| JP | 2013-244907 | | 12/2013 | |
| JP | 2015-009789 | | 1/2015 | |
| WO | WO 2014/075827 | | 5/2014 | |
| WO | WO 2014/136883 | | 9/2014 | |

* cited by examiner

*(Prior Art)*

FIG. 5

PNEUMATIC TIRE

TECHNICAL FIELD

The present technology relates to a pneumatic tire.

BACKGROUND ART

Conventionally, a plurality of circumferential main grooves extending in the tire circumferential direction and lug grooves and sipes that traverse land portions defined in the tire lateral direction by two circumferential main grooves are provided in a tread pattern of a pneumatic tire. All-season pneumatic tires (hereinafter referred to as all-season tires) are positioned as tires intermediate between regular, what are called summer tires used during non-snow seasons, and snow tires referred to as winter tires, and are widely used in North America and Europe. This all-season tire is required to have excellent control performance and braking and driving performance on a snowy road surface, so a large number of sipes and lug grooves are provided in addition to the circumferential main groove in order to increase the edge components.

Pneumatic tires having improved uneven wear resistance in the central portion in the tread lateral direction while at the same time ensuring performance on snow are known (refer to Japan Unexamined Patent Publication No. 2013-244907).

Such a pneumatic tire includes a central circumferential main groove formed in a center portion in the tire lateral direction of the tread and extending in the tire circumferential direction; an outer circumferential main groove that is formed further on the outside in the tire lateral direction than the central circumferential main groove in the tread and formed adjacent to the central circumferential main groove, and that extends in the tire circumferential direction; lateral main grooves that are formed in the tread, extend in a direction intersecting the tire circumferential direction, communicate with the central circumferential main groove and the outer circumferential main groove, respectively, and have a groove depth with respect to the tread surface that is deeper than the groove depth of the central circumferential main groove and shallower than the groove depth of the outer circumferential main groove; and a central block defined by the central circumferential main groove, the outer circumferential main groove and the lateral main grooves. Sipes are provided in the groove bottom of the central circumferential main groove.

In the pneumatic tire described above, performance on snow may be ensured by the edges of the center block formed by the lateral main grooves. Furthermore, the lateral main grooves respectively communicate with the central circumferential main groove and the outer circumferential main groove, the groove depth of the lateral main grooves is set to be shallower than the groove depth of the outer circumferential main groove, and the groove depth of the central circumferential main groove is set to be shallower than that of the lateral main grooves, so the rigidity of the central block may be ensured, excessive deformation of the central block when the tire is rolling under a load may be suppressed, and heel and toe wear of the central block may be suppressed. This makes it possible to improve uneven wear resistance of the center portion in the tread width direction while ensuring performance on snow.

With the pneumatic tire described above, performance on snow may be ensured by the edge of the center block, and uneven wear resistance (heel and toe wear) at the center portion in the tread width direction may be improved; however, the performance on snow, including control performance on snow required for a tire for a passenger vehicle, is still not sufficient. In the case of performance on snow, including control performance, sipes and lug grooves are preferably disposed efficiently in an intermediate land portion located outward in the tire lateral direction with respect to the central portion in the tread width direction and located further on the inside in the tire lateral direction than the shoulder land portion. In order to improve the performance on snow due to the edge effect of the sipes, it is conceivable that a large number of sipes be provided in the intermediate land portion, however, this reduces the block rigidity of the intermediate land portion, so wear becomes easier, wear increases compared to other regions, and uneven wear resistance is adversely affected.

SUMMARY

The present technology provides a pneumatic tire capable of improving uneven wear resistance and performance on snow by using a tread pattern that is different from the tread pattern described above.

A first aspect of the present technology is a pneumatic tire provided with a tread pattern.

The tread pattern includes a pair of circumferential main grooves formed by an inner circumferential main groove and an outer circumferential main groove, the inner circumferential main groove being provided in a half-tread region on one side in a tire lateral direction with respect to a tire equator line and annularly extending in a tire circumferential direction, and the outer circumferential main groove being provided outward in the tire lateral direction relative to the inner circumferential main groove and annularly extending in the tire circumferential direction, a plurality of lug grooves connecting between the pair of circumferential main grooves, and provided at intervals in the tire circumferential direction, a plurality of block land portions defined by the pair of circumferential main grooves and the plurality of lug grooves, and a first sipe and a second sipe provided in each region of the block land portions and connecting between the pair of circumferential main grooves. Each of the plurality of lug grooves includes a pair of inclined groove portions that approach each other while advancing toward a first-direction in the tire circumferential direction from connection ends at which the pair of inclined groove portions connect with the pair of circumferential main grooves, and a groove turning portion that connects with ends of the pair of inclined groove portions and is bent projecting to the first-direction in the tire circumferential direction. The groove turning portion includes a groove raised bottom portion that has a groove depth shallower than a groove depth of the inclined groove portions is provided in the groove turning portion. The first sipe is located on the side of the first-direction in the tire circumferential direction relative to the second sipe. The first sipe and the second sipe each includes a pair of inclined sipe portions that approach each other while advancing toward the first-direction from connection ends at which the pair of inclined groove portions connect with the pair of circumferential main grooves, and a sipe turning portion that is bent projecting toward the first-direction and connects with ends of the pair of inclined sipe portions to each other. A first position in the tire lateral direction of a projecting apex of the sipe turning portion of the first sipe is positioned within a range of a raised bottom portion in the tire lateral direction in which the groove raised bottom portion is provided, and the first position is positioned further inward in the tire lateral direction relative to a second position in the tire lateral direction of a projecting apex of the sipe turning portion of the second sipe.

Preferably a third sipe that extends outward in the tire lateral direction from the inner circumferential main groove inclining with respect to the tire lateral direction is provided in each region of the block land portions that is sandwiched in the tire circumferential direction between the first sipe and the second sipe, the third sipe extending along to one of the inclined sipe portions of the first sipe and the second sipe that extends from the inner circumferential main groove, and the third sipe including a terminating end within a range of the raised bottom portion in the tire lateral direction.

Preferably, an outer inclined sipe portion of the inclined sipe portions of the first sipe is a portion that extends in a straight line at an incline with respect to the tire lateral direction, the outer inclined sipe portion extending from the outer circumferential main groove, the third sipe does not intersect with the outer inclined sipe portion and a linear extension line that extend the outer inclined sipe portion beyond a connection end between the outer inclined sipe portion and the sipe turning portion, and the sipe turning portion connected with the outer inclined sipe portion includes a portion that bends to a side opposite to the terminating end of the third sipe with the extension line as a boundary.

Preferably, the second position of the second sipe and the third position of the terminating end of the third sipe in the tire lateral direction are positioned within a range of 60% of the width W in the tire lateral direction of the range of the raised bottom portion from a center position of the groove raised bottom portion in the tire lateral direction.

Preferably, a position in the tire lateral direction of a projecting apex of the groove turning portion is inward in the tire lateral direction relative to a center line in the tire lateral direction of the block land portion.

Preferably, when a half-tread region in which the inner circumferential main groove and the outer circumferential main groove are provided is referred to as a first half-tread region, the inner circumferential main groove is referred to as a first inner circumferential main groove, and the outer circumferential main groove is referred to as a first outer circumferential main groove, a second half-tread region opposite to the first half-tread region in the tire lateral direction includes a second inner circumferential main groove annularly extending in the tire circumferential direction, a second outer circumferential main groove provided outward in the tire lateral direction relative to the second inner circumferential main groove, and extending annularly in the tire circumferential direction, a continuous land portion, defined by the second inner circumferential main groove and the second outer circumferential main groove, and going around an entire circumference of the pneumatic tire in the tire circumferential direction, and a fourth sipe and a fifth sipe that extend in a region of the continuous land portion inclining with respect to the tire lateral direction, and connect with the second inner circumferential main groove and the second outer circumferential main groove, the fourth sipe and the fifth sipe each includes an inner inclined portion provided inside the region of the continuous land portion, and both-side inclined portions provided on both sides of the inner inclined portion in the tire lateral direction and connected with both the second inner circumferential main groove and the second outer circumferential main groove, the inner inclined portion of the fourth sipe and the inner inclined portion of the fifth sipe are parallel to each other, and an inclination angle of the inner inclined portion with respect to the tire lateral direction is larger than an inclination angle of the both-side inclined portions with respect to the tire lateral direction.

Preferably, the tread pattern includes a center continuous land portion that goes around an entire circumference of the pneumatic tire in the tire circumferential direction, is positioned between the first inner circumferential main groove and the second inner circumferential main groove and is defined by the first inner circumferential main groove and the second inner circumferential main groove, a plurality of first center lug grooves provided at intervals in the tire circumferential direction and extending inward in the tire lateral direction from the first inner circumferential main groove and terminating in a region of the center continuous land portion, and a plurality of second center lug grooves provided at intervals in the tire circumferential direction and extending inward in the tire lateral direction from the second inner circumferential main groove and terminating in the region of the center continuous land portion, any one of the plurality of second center lug grooves is provided in a region in the tire circumferential direction between two adjacent first center lug grooves of the plurality of first center lug grooves in the tire circumferential direction, and any one of the plurality of first center lug grooves is provided in a region in the tire circumferential direction between two adjacent second center lug grooves of the plurality of second center lug grooves in the tire circumferential direction.

Preferably, a maximum groove depth of the plurality of second center lug grooves is shallower than a maximum groove depth of the plurality of first center lug grooves.

Preferably, the pneumatic tire is designated to cause one of both sides in the tire lateral direction being an outer side of a vehicle when mounted on the vehicle, and a side in which the first half-tread region is provided in the tire lateral direction is designated to be the outer side of the vehicle.

Preferably, a maximum sipe depth of the first sipe and the second sipe is less than 90% of a groove depth of each of the inner circumferential main groove and the outer circumferential main groove.

With the pneumatic tire described above, uneven wear resistance and performance on snow may be improved.

DETAILED DESCRIPTION

A pneumatic tire according to embodiments of the present technology will be described below in detail with reference to the accompanying drawings.

The pneumatic tire of the embodiments described below is, for example, applied to an all-season tire for a passenger vehicle; however, may also be applied to an all-season tire for a light truck, or an all-season tire for a bus or a truck.

Herein, "tire lateral direction" is the direction parallel with the rotation axis of the pneumatic tire. "Outward in the tire lateral direction" is the direction in the tire lateral direction away from a tire equator line CL that represents the tire equatorial plane with respect to the position of comparison. "Inward in the tire lateral direction" is the direction in the tire lateral direction toward the tire equator line CL with respect to the position of comparison. "Tire circumferential direction" is the direction in which the pneumatic tire rotates about the rotation axis of the pneumatic tire. The tire circumferential direction includes a first-direction and a second-direction that are different in direction from each other. "Tire radial direction" is the direction orthogonal to the rotation axis of the pneumatic tire. "Outward in the tire radial direction" is the direction away from the rotation axis along the tire radial direction with respect to the position of comparison. "Inward in the tire radial direction" is the direction toward the rotation axis along the tire radial direction with respect to the position of comparison.

Tire Structure

Figure 1:
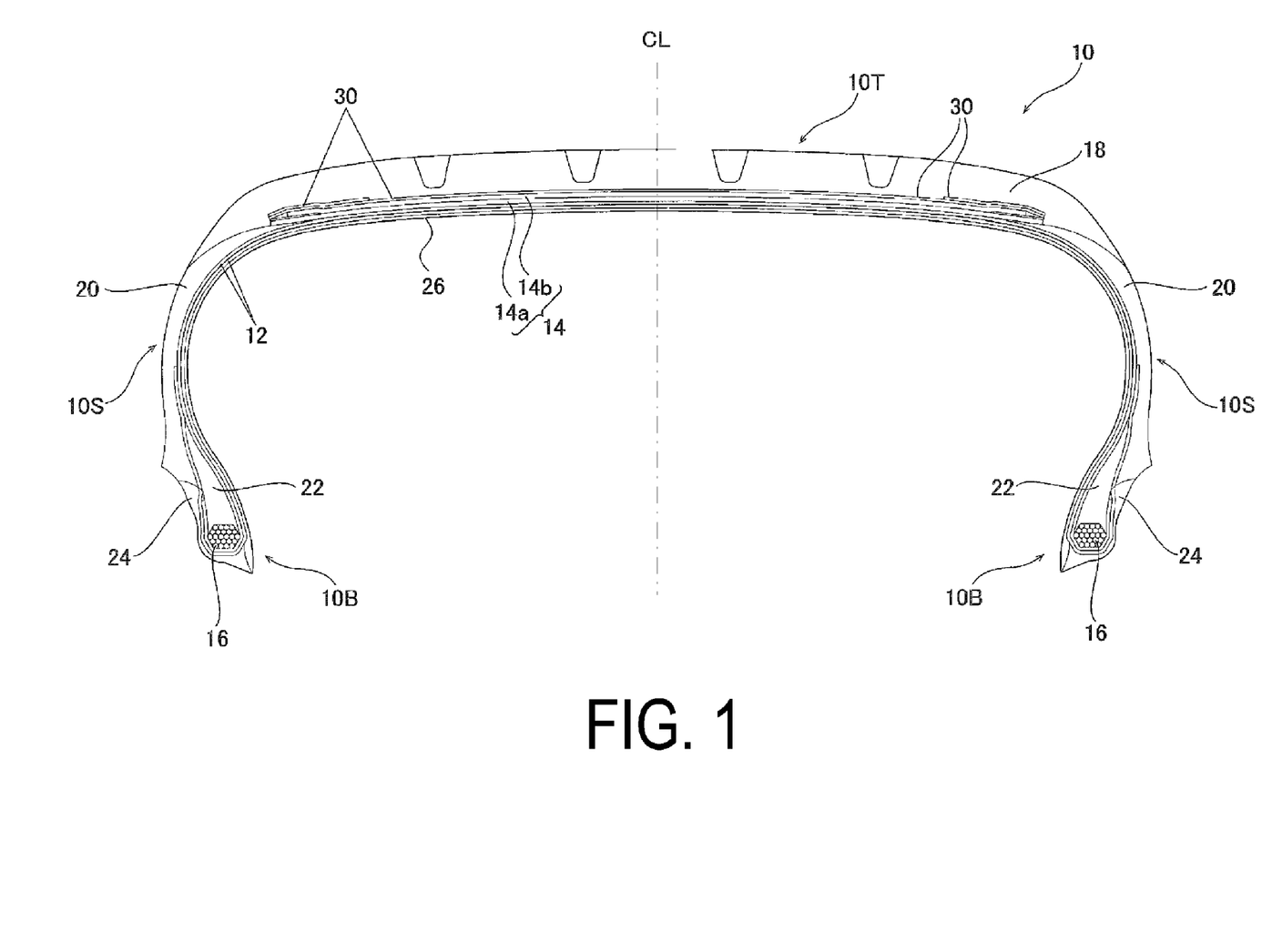
FIG. 1 is a tire cross-sectional view of a tire according to an embodiment.

FIG. 1 is a tire cross-sectional view of a tire 10 according to an embodiment. The tire 10 includes a tread portion 10T including a tread pattern, a pair of bead portions 10B, and a pair of side portions 10S provided on both sides of the tread portion 10T, connecting the pair of bead portions 10B and the tread portion 10T.

The tire 10 includes a carcass ply layer 12, a belt layer 14, and a bead core 16 as framework members or framework member layers, and around these framework members, mainly includes a tread rubber member 18, a side rubber member 20, a bead filler rubber member 22, a rim cushion rubber member 24, and an inner liner rubber member 26.

The carcass ply layer 12 is constituted of a carcass ply member that is made of organic fibers covered with rubber and that is wound between a pair of annular bead cores 16 and formed into an annular shape. The carcass ply member is wound around the bead core 16 and extends outward in the tire radial direction. The belt layer 14 is provided outward of the carcass ply layer 12 in the tire radial direction, and is constituted of two belt members 14a and 14b. The belt layer 14 members are constituted of rubber-covered steel cords. The steel cords are disposed inclined at a predetermined angle of, for example, from 20 to 30 degrees with respect to the tire circumferential direction. A width in the tire lateral direction of the lower layer belt member 14a is greater than that of the upper layer belt member 14b. The steel cords of the two belt members 14a and 14b are inclined in opposite directions. As such, the belt members 14a and 14b are crossing layers serving to suppress expansion of the carcass ply layer 12 due to the pressure of the air in the tire.

The tread rubber member 18 is provide on the outer side of the belt layer 14 in the tire radial direction, and side rubber members 20 are connected to both end portions of the tread rubber member 18 to form the side portions 10S. The rim cushion rubber members 24 are provided at the inner ends of the side rubber members 20 in the tire radial direction and come into contact with a rim on which the tire 10 is mounted. The bead filler rubber members 22 are provided on the outer side of the bead cores 16 in the tire radial direction being interposed between a portion of the carcass ply layer 12 before where it is wound around the bead cores 16 and a portion of the carcass ply layer 12 after being wound around the bead cores 16. The inner liner rubber member 26 is provided on the inner surface of the tire 10 facing a tire cavity region that is filled with air and is surrounded by the tire 10 and the rim.

Moreover, the tire 10 is provided with a two-layer belt cover layer 30 that covers the belt layer 14 from the outside in the tire radial direction of the belt layer 14, and in which an organic fiber or a steel cord is covered with rubber. Also, the tire 10 may include a bead reinforcing member between the carcass layer 12 wound around the bead core 16 and the bead filler rubber member 22.

The tire structure of the present embodiment is as described above. However, the tire structure is not particularly limited and a known tire structure is applicable.

Tread Pattern

Figure 2:
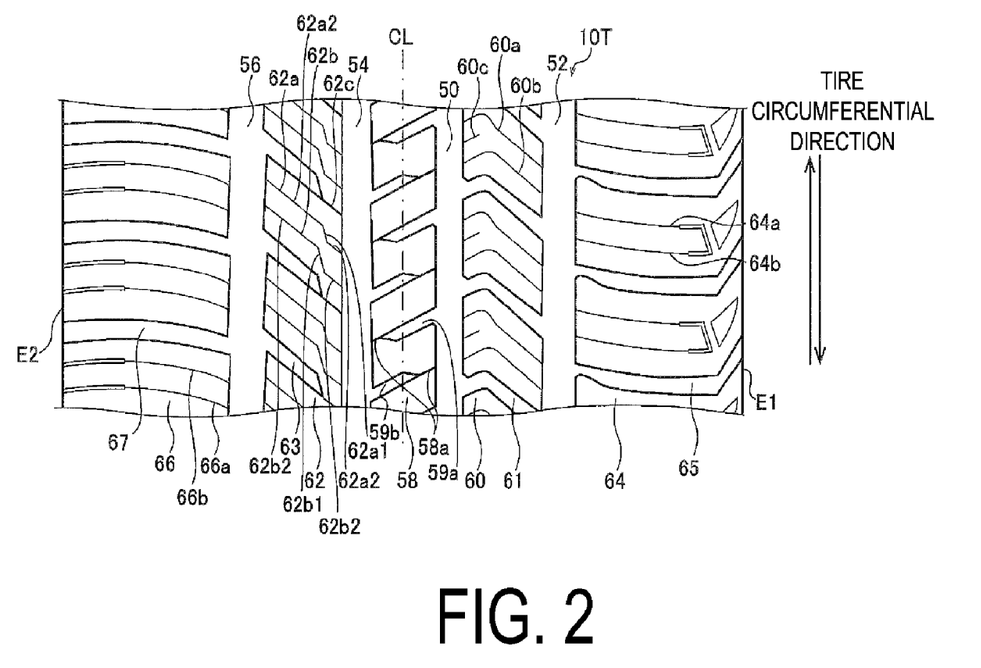
FIG. 2 is a diagram describing a tread pattern of an embodiment.

FIG. 2 is a diagram describing an example of a tread pattern of an embodiment. The tread pattern illustrated in FIG. 2 and described below is an asymmetric pattern with respect to the tire equator line CL, however, is not necessarily an asymmetrical pattern. For example, the pattern may be a point symmetrical pattern that is a combination of the tread pattern on the right of the inner circumferential main groove 54 in FIG. 2, and a tread pattern in which of the tread pattern above, the portion outward in the tire lateral direction with respect to the inner circumferential main groove 50 is rotated 180 degrees on the plane of FIG. 2 (rotated so that the upward direction becomes the downward direction) and that is disposed on the left of the inner circumferential main groove 54 that is at the left of the tire equator line CL.

As illustrated in FIG. 2, the tread pattern of the tread portion 10T mainly includes an inner circumferential main grooves 50 and 54, outer circumferential main grooves 52 and 56, a center continuous land portion 58, an intermediate block land portion 60, an intermediate continuous land portion 62, lateral land portions 64 and 66, and lug grooves 59a, 59b, 61, 63, 65 and 67.

The tread portion 10T includes, at both direction in the tire lateral direction from the tire equator line (tire centerline) CL, an intermediate block land portion 60 defined in the tire lateral direction by the inner circumferential main groove 50 and the outer circumferential main groove 52, and an intermediate continuous land portion 62 defined in the tire lateral direction by the inner circumferential main groove 54 and the outer circumferential main groove 56. Furthermore, the tread portion 10T includes side land portions 64 and 66 that come in contact with the outer circumferential main grooves 52 and 56, and are formed on the outer side in the tire lateral direction of the outer circumferential main grooves 52 and 56, and include the ground contact ends of the pneumatic tire 10 in the region thereof.

The inner circumferential main grooves 50 and 54 are main grooves that extend in the tire circumferential direction in an annular shape and go around the entire circumference in the tire circumferential direction, and are disposed being located inward in the tire lateral direction (closer to the tire equator line CL) relative to the outer circumferential main grooves 52 and 56, and come in contact with the center continuous land portion 58 defining the center continuous land portion 58.

The outer circumferential main grooves 52 and 56 are main grooves that extend in the tire circumferential direction in an annular shape and go around the entire circumference in the tire circumferential direction, and are disposed being located outward in the tire lateral direction relative to the inner circumferential main grooves 50 and 54, and come in contact with the intermediate block land portion 60 and the intermediate continuous land portion 62 defining the intermediate block land portion 60 and the intermediate continuous land portion 62. The intermediate block land portion 60 is defined in the tire circumferential direction by lug grooves 61 forming a plurality of blocks.

More specifically, the center continuous land portion 58, the lug grooves 59a (first center lug grooves), and the lug grooves 59b (second center lug grooves) are provided between the inner circumferential main groove 50 (first inner circumferential main groove) and the inner circumferential main groove 54 (second inner circumferential main groove). Hereinafter, the lug grooves 59a and 59b are referred to as center lug grooves 59a and 59b.

The center continuous land portion 58 is a continuous land portion that goes around the entire circumference in the tire circumferential direction, and is defined by the inner circumferential main groove 50 and the inner circumferential main groove 54. The center lug grooves 59a extend from the inner circumferential main groove 50 inward in the tire lateral direction and terminate within the region of the center continuous land portion 58. The center lug grooves 59b extend from the inner circumferential main groove 54 inward in the tire lateral direction and terminate within the region of the center continuous land portion 58. Each of the center lug grooves 59a and 59b preferably terminates across the tire equator line CL. A plurality of center lug grooves 59a and center lug grooves 59b are provided at intervals in the tire circumferential direction. One center lug groove 59b is provided in the region in the tire circumferential direction between two center lug grooves 59a adjacent in the tire circumferential direction, and one of the center lug grooves 59a is provided in the region in the tire circumferential direction between two center lug grooves 59b adjacent in the tire circumferential direction. In other words, lug grooves 59a extending from the inner circumferential main groove 50 and lug grooves 59b extending from the inner circumferential main groove 54 are provided alternately along the tire circumferential direction.

Sipes 58a that communicate with the terminating ends of the center lug grooves 59a and the inner circumferential main groove 54 or communicate with the terminating ends of the center lug grooves 59b and the inner circumferential main groove 50 are provided in the region of the center continuous land portion 58.

In FIG. 2, intermediate block land portions 60 and lug grooves 61 are provided between the inner circumferential main groove 50 (first inner circumferential main groove) and the outer circumferential main groove 52 (first outer circumferential main groove) provided in the half-tread region at the right of the tire equator line CL.

A plurality of lug grooves 61 are provided at predetermined intervals in the tire circumferential direction.

A plurality of intermediate block land portions 60 are provided in rows in the tire circumferential direction and are defined in the tire lateral direction by the inner circumferential main groove 50 and the outer circumferential main groove 52, and are defined in the tire circumferential direction by the lug grooves 61.

Sipes 60a (first sipes) and sipes 60b (second sipes) that connect between the inner circumferential main groove 50 and the outer circumferential main groove 54 are provided in a region of each of the intermediate block land portions 60.

Figure 3:
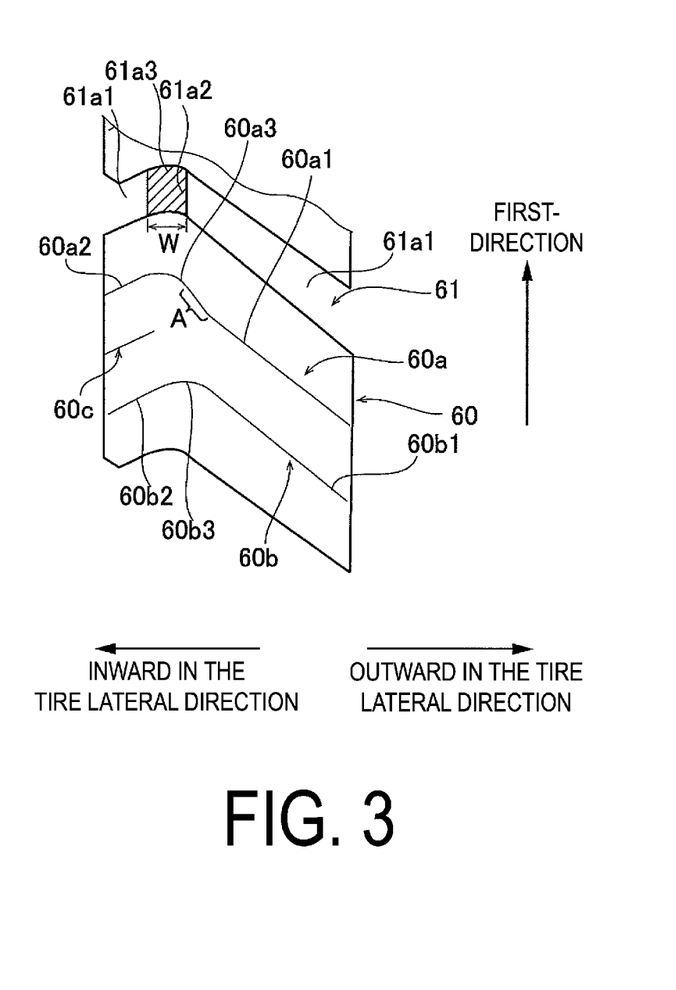
FIG. 3 is an enlarged view for a more detailed description of the block land portion and the lug groove illustrated in FIG. 2.

FIG. 3 is an enlarged diagram illustrating, in detail, an intermediate block land portion 60 and a lug groove 61 illustrated in FIG. 2.

Each of the lug grooves 61 defining the intermediate block land portions 60 in the tire circumferential direction includes a pair of inclined groove portions 61a1 and 61a1, and a groove turning portion 61a2. The pair of inclined groove portions 61a1 and 61a1 are portions that approach each other from the connection ends of the inner circumferential main groove 50 and the outer circumferential main groove 52 while going toward the first-direction in the tire circumferential direction, and the groove turning portion 61a2 is a portion that bends connecting the ends of the pair of inclined groove portions 61a1 and 61a1 and projecting toward the first-direction in the tire circumferential direction. A groove raised bottom portion 61a3 having a groove depth that is less than the groove depth of the inclined groove portion 61a1 is partially provided in the groove turning portion 61a2. In FIG. 3, the region of the groove raised bottom portion 61a3 is indicated by diagonal lines. The groove raised bottom portion 61a3 may be provided in all regions of the groove turning portion 61a2, or may be provided in a part of the groove turning portion 61a2. Note that the projecting apex of the groove wall on a first-direction side of the groove turning portion 61a2 and the projecting apex of the groove wall on the side opposite the first-direction side of the groove turning portion 61a2 are at the same position in the tire lateral direction.

The sipe 60a is located on the first-direction side in the tire circumferential direction relative to the sipe 60b.

The sipe 60a includes a pair of inclined sipe portions 60a1 and 60a2 that approach each other from the connection ends of the inner circumferential main groove 50 and the outer circumferential main groove 52 while advancing toward the first-direction, and a sipe turning portion 60a3 that bends projecting toward the first-direction that connects the ends of the pair of inclined sipes 60a1 and 60a2.

The sipe 60b also includes a pair of inclined sipe portions 60b1 and 60b2 that approach each other from the connection ends of the inner circumferential main groove 50 and the outer circumferential main groove 52 while advancing toward the first-direction, and a sipe turning portion 60b3 that bends projecting toward the first-direction that connects the ends of the pair of inclined sipe portions 60b1 and 60b2.

Here, the position in the tire lateral direction of the projecting apex of the sipe turning portion 60a3 of the sipe 60a is positioned within the range of the raised bottom portion in the tire lateral direction in which the groove raised bottom portion 61a3 of the lug groove 61 is provided, and is positioned inward in the tire lateral direction relative to the position of the sipe turning portion 60b3 of the sipe 60b in the tire lateral direction. In other words, the position in the tire lateral direction of the projecting apex of the sipe turning portion 60a3 is positioned within the range of the raised bottom portion of the groove raised bottom portion 61a3, and is positioned inward in the tire lateral direction relative to the position of the projecting apex of the sipe turning portion 60b3 in the tire lateral direction.

The maximum sipe depth of the sipe 60a and the sipe 60b is preferably less than 90% of the groove depth of the inner circumferential main groove 50 and the outer circumferential main groove 52.

Note that the position in the tire lateral direction of the projecting apex of the groove turning portion 61a2 of the lug groove 61 connecting the inner circumferential main groove 50 and the outer circumferential main groove 52 is positioned inward in the tire lateral direction relative to the center line in the tire lateral direction of the intermediate block land portion 60, however, may be on the center line in the tire lateral direction, or may be outward in the tire lateral direction. However, from the aspect of improving control performance on snow by increasing the edge effect of the inclined groove portion 61a1 outward in the tire lateral direction, the position in the tire lateral direction of the projecting apex of the groove turning portion 61a2 is preferably inward in the tire lateral direction relative to the center line in the tire lateral direction of the intermediate block land portion 60.

In FIG. 2, an intermediate continuous land portion 62 (continuous land portion) and lug grooves 63 are provided between the inner circumferential main groove 54 (second inner circumferential main groove) and the outer circumferential main groove 56 (second outer circumferential main groove) provided in the half-tread region at the left of the tire equator line CL.

The intermediate continuous land portion 62 is a land portion that is defined by the inner circumferential main groove 54 and the outer circumferential main groove 56 and goes around the entire circumference in the tire circumferential direction without interruption by the lug grooves.

Sipes 62a (fourth sipes) and sipes 62b (fifth sipes) that extend at an incline with respect to the tire lateral direction and connect the inner circumferential main groove 54 and the outer circumferential main groove 56 are provided in the region of the intermediate continuous land portion 62.

The lug grooves 63 extend from the outer circumferential main groove 56 to the inner circumferential main groove 54 and terminate without communicating with the inner circumferential main groove 54. A plurality of lug grooves 63 are provided at predetermined intervals in the tire circumferential direction. Sipes 62c that connect the terminating ends of the lug grooves 63 and the inner circumferential main groove 54 are provided in the region of the intermediate continuous land portion 62 from the terminating ends of the lug grooves 63.

The lug grooves 63 and the sipes 62a, 62b and 62c are all inclined with respect to the tire lateral direction. The direction of this inclination is toward a different side in the tire circumferential direction from the tire lateral direction with respect to the inclination direction of the lug grooves 59a and 59b and the sipes 58a. More specifically, the lug grooves 63 and the sipes 62a, 62b and 62c extend toward the second-direction in the tire circumferential direction when advancing inward from outward in the tire lateral direction.

The sipes 62a and 62b include inner inclined portions 62a1 and 62b1 that are provided within the region of the intermediate continuous land portion 62, and both side inclined portions 62a2 and 62b2 that are provided on both sides in the tire lateral direction of the inner inclined portions 62a1 and 62b1. The both side inclined portions 62a2 and 62b2 connect to each of the inner circumferential main groove 54 and the outer circumferential main groove 56. The inclination angle of the inner inclined portions 62a1 and 62b1 with respect to the tire lateral direction is greater than the inclination angle of the both side inclined portions 62a2 and 62b2 with respect to the tire lateral direction.

Side land portions 64 and 66 are respectively provided on the outer side of the outer circumferential main grooves 52 and 56 in the tire lateral direction and are respectively in contact with the outer circumferential main grooves 52 and 56. The side land portions 64 and 66 extend to the tread pattern ends E1 and E2.

The lug grooves 65 extend from the outer circumferential main groove 52 outward in the tire lateral direction to the pattern end E1. A plurality of lug grooves 65 are provided at predetermined intervals in the tire circumferential direction. Sipes 64a and 64b that extend outward in the tire lateral direction from the outer circumferential main groove 52 are provided between adjacent lug grooves 65 in the tire circumferential direction in the region of the side land portion 64.

The lug grooves 67 extend from the outer circumferential main groove 56 outward in the tire lateral direction to the pattern end E2. A plurality of lug grooves 67 are provided at predetermined intervals in the tire circumferential direction. Sipes 66a and 66b extending outward in the tire lateral direction from the outer circumferential main groove 56 are provided between adjacent lug grooves 67 in the tire circumferential direction in the region of the side land portions 66.

As described above, the sipes 60a and 60b are provided in the intermediate block land portion 60 of the tread pattern of the present embodiment. Accordingly, performance on snow may be improved by the edge effect of the sipes 60a and 60b, however, the block rigidity of the intermediate block land portion 60 is reduced due to the sipes 60a and 60b being provided. In particular, the groove turning portion 61a2 of the lug grooves 61 that define the intermediate block land portion 60 in the tire circumferential direction is a portion where strain tends to concentrate when the intermediate block land portion 60 deforms under lateral or longitudinal forces from the road surface, and is a portion that affects the size of deformation of the intermediate block land portion 60. Thus, by providing the groove raised bottom portion 61a3 in the groove turning portion 61a2, the block rigidity of the intermediate block land portion 60 may be increased. In particular, by providing the sipe turning portion 60a3 of the sipe 60a near the groove raised bottom portion 61a3 of the lug groove 61, or in other words, by providing the projecting apex of the sipe turning portion 60a3 within the range of a raised bottom portion in the tire lateral direction in which the groove raised bottom portion 61a3 of the lug groove 61 is provided, and furthermore, by providing the projecting apex of the sipe turning portion 60a3 inward in the tire lateral direction relative to the position in the tire lateral direction of the projecting apex of the sipe turning portion 60b3 of the sipe 60b, a decrease in block rigidity of the intermediate block land portion 60 may be suppressed while exerting the edge effect of the sipe 60a. As a result, uneven wear resistance and performance on snow may be improved.

As illustrated in FIGS. 2 and 3, a sipe 60c (third sipe) is preferably provided in a region within the region of the intermediate block land portion 60 sandwiched in the tire circumferential direction by the sipe 60a and the sipe 60b. The sipe 60c preferably extends from the inner circumferential main groove 50 inclining outward in the tire lateral direction with respect to the tire lateral direction, along the inclined sipe portions 60a2, 60b2 of the sipe 60a and sipe 60b extending from the inner circumferential main groove 50, and includes a terminating end in the range of the raised bottom portion in the tire lateral direction. The positions in the tire lateral direction of the projecting apex of the sipe turning portion 60a3 of the sipe 60a and the projecting apex of the sipe turning portion 60b3 of the sipe 60b are different from each other, and thus it is possible to easily ensure a space for providing the sipe 60c in a portion of the intermediate block land portion 60 on the inner circumferential main groove 50 side. Accordingly, edge effects may be further increased.

Moreover, as illustrated in FIG. 3, of the inclined sipe portions 60a1 and 60a2, the inclined sipe portion 60a1 that is an outer inclined sipe portion of the sipe 60a extending from the outer circumferential main groove 52 is a portion that extends in a straight line at an incline with respect to the tire lateral direction. At this time, the sipe 60c does not intersect with the inclined sipe portion 60a1, and furthermore does not intersect with a linear extension line that extends the inclined sipe portion 60a1 beyond the connection end of the inclined sipe portion 60a1 and the sipe turning portion 60a3. At this time, according to an embodiment, the sipe turning portion 60a3, connected to the inclined sipe portion 60a1, preferably includes a portion that bends or curves to a side opposite to the terminating end of the sipe 60c with the above-described extension line as a boundary (see Region A in FIG. 3). Accordingly, it is possible to increase the distance between the terminating end of the sipe 60c and the sipe turning portion 60a3 and suppress the decrease in block rigidity, and also to increase the length of the sipe 60a and thus further increase the edge effect.

According to an embodiment, the position (second position) of the projecting apex of the sipe turning portion 60b3 of the sipe 60b in the tire lateral direction and the position (third position) of the trailing end of the sipe 60c in the tire lateral direction are preferably within a range of 60% of the width W in the tire lateral direction of the raised bottom portion from the center position in the tire lateral direction of the groove raised bottom portion 61a3 (see FIG. 3). By providing the projecting apex of the sipe turning portion 60b3 and the terminating end of the sipe 60c in this range, it is possible to effectively suppress a decrease in block rigidity of the intermediate block land portion 60 and improve the uneven wear resistance.

As described above, the inner circumferential main groove 54 (second inner circumferential main groove), the outer circumferential main groove 56 (second outer circumferential main groove) provided outward in the tire lateral direction relative to the inner circumferential main groove 54, and the intermediate continuous land portion 62 that is defined by the inner circumferential main groove 54 and the outer circumferential main groove 56 and that goes around the entire circumference in the tire circumferential direction are provided in the half-tread region at the left of the tire equator line CL illustrated in FIG. 2. A sipe 62a (fourth sipe) and a sipe 62b (fifth sipe) that extend at an incline with respect to the tire lateral direction and connect the inner circumferential main groove 54 and the outer circumferential main groove 56 are provided in the region of the intermediate continuous land portion 62. Both the sipe 62a (fourth sipe) and the sipe 62b (fifth sipe) respectively include an inner inclined portion 62a1 and 62b1 and a both-side inclined portion 62a2 and 62b2. Here, preferably, the inner inclined portion 62a1 and the inner inclined portion 62b1 are parallel to each other, and the inclination angle of the inner inclined portions 62a1 and 62a2 with respect to the tire lateral direction is greater than the inclination angle of the both-side inclined portions 62a2 and 62b2 with respect to the tire lateral direction. By making the inclination angle of the inner inclined portions 62a1 and 62b1 greater than the inclination angle of the both-side inclined portions 62a2 and 62b2, the edge component along the tire circumferential direction increases, and thus the edge effect when cornering on snow may be increased. In other words, controllability on snow may be improved. Moreover, by providing the inner inclined portion 62a1 and the inner inclined portion 62b1 parallel to each other, the separation distance between the sipe 62a and the sipe 62b may be prevented from becoming close, thus a decrease in the rigidity of the intermediate continuous land portion 62 may be suppressed, and uneven wear resistance is improved.

In addition, as illustrated in FIG. 2, one center lug groove 59b extending from the inner circumferential main groove 54 and terminating without being connected to the inner circumferential main groove 50 is provided in a region in the tire circumferential direction that extends from the inner circumferential main groove 50 and that is between two center lug grooves 59a adjacent in the tire circumferential direction, and one center lug groove 59a extending from the inner circumferential main groove 50 and terminating without being connected to the inner circumferential main groove 54 is provided in a region in the tire circumferential direction that extends from the inner circumferential direction main groove 54 and that is between two second center lug grooves 59b that are adjacent in the tire circumferential direction. As a result, the center continuous land portion 58 that goes around the tire circumference may be formed, and the edge component may be increased by the lug grooves 59a and 59b without unevenly distributing the block rigidity. Accordingly, performance on snow including control performance on snow may be improved while suppressing wear of the center continuous land portion 58.

In this case, the maximum groove depth of the center lug groove 59b is preferably shallower than the maximum groove depth of the center lug groove 59a. As illustrated in FIG. 2, the tread pattern in the half-tread region at the right from the tire equator line CL, by utilizing the sipes and lug grooves, increases edge effect and improves performance on snow. By making the groove depth of the center lug groove 59a deeper than the groove depth of the center lug groove 59b, it is possible to trap much snow in the center lug groove 59a, and the edge effect may be increased, so the performance on snow may be improved.

The pneumatic tire 10 is designated so that one side of both sides in the tire lateral direction is on the vehicle outer side when mounted on a vehicle. For this specification, the information on the mounting outer side or the mounting inner side is displayed as a side pattern in the side portion 10S using letters, symbols, signs, or the like. In the case of the tread pattern illustrated in FIG. 2, preferably, the side of the half-tread region at the right of the tire equator line CL illustrated in FIG. 2 is designated to be on the vehicle outer side. In order to improve performance on snow, in the half-tread region at the right of the tire equator line CL illustrated in FIG. 2, the edge effect is increased by utilizing the sipes and lug grooves, and in the half-tread region at the left of the tire equator line CL illustrated in FIG. 2 the intermediate continuous land portion 62 is provided as a continuous land portion improving uneven wear resistance. Vehicles on which tires are mounted are often set to be negative camber, so, taking into consideration the negative camber, preferably the tire 10 is mounted on the vehicle so that the half tread region at the left in FIG. 2 is on the inner side of the vehicle, and so that half-tread region at the right in FIG. 2 is on the outer side of the vehicle where the ground contact surface tends to be large during cornering and braking or accelerating.

EXAMPLES, CONVENTIONAL EXAMPLE, AND COMPARATIVE EXAMPLES

To confirm the effect of the tire according to the present embodiment, uneven wear resistance and performance on snow were evaluated by varying the tread pattern.

The construction illustrated in FIG. 1 was used for the manufactured tire (tire size: 265/50R20 111W). The manufactured tires were mounted on a rim (rim size: 20×8.5J) (air pressure of 250 kPa), and further mounted on a test vehicle (SUV vehicle with an engine displacement of 3.6 liters).

Evaluation of Uneven Wear Resistance

In the evaluation of uneven wear resistance, after driving the test vehicle for 10000 km, the residual groove depth (average value) of the inner circumferential main grooves 50 and 54 was measured, and the difference between the initial groove depth and the measured groove depth was taken as the amount of wear in the center continuous land portion 58.

Moreover, the remaining groove depth (average value) of the outer circumferential main grooves 52 and 56 was measured, and the difference between the initial groove depth and the measured groove depth was taken as the amount of wear of the intermediate block land portion 60 and the intermediate land portion 62. Furthermore, an evaluation value of uneven wear resistance is calculated by dividing the difference obtained by subtracting the amount of wear in the center land portion 58 from the amount of wear of the intermediate block land portion 60 and the intermediate continuous land portion 62 by the amount of wear in the center continuous land portion 58. In Tables 1 and 2 below, the uneven wear resistance was obtained by indexing the reciprocals of the above evaluation values of other Comparative Examples and Examples with reference to the reciprocals of the above evaluation values of the Conventional Example. The index of the Conventional Example is 100. Thus, the higher the index, the better the uneven wear resistance.

Evaluation of Performance on Snow

The braking performance on snow was evaluated by driving the test vehicle on a course including a snow-covered road surface determined in advance, measuring a braking distance when fully braking from a speed of 30 km/h, and indexing the reciprocal of the braking distance of the other Comparative Examples and Examples based on the reciprocal of the braking distance of the Conventional Example. The index of the Conventional Example is 100. Thus, the higher the index, the better the braking performance on snow.

Furthermore, the test vehicle was driven on a predetermined course including a snow-covered road surface, and sensory evaluation of the control performance on snow was performed by the driver. For the sensory evaluation, an index of 100 was used for the Conventional Example. In the Comparative Examples and Examples, the index was set to be higher as the control performance on snow became more excellent.

Tables 1 and 2 below give the specifications of the tread pattern and the evaluation results thereof.

Figure 4:
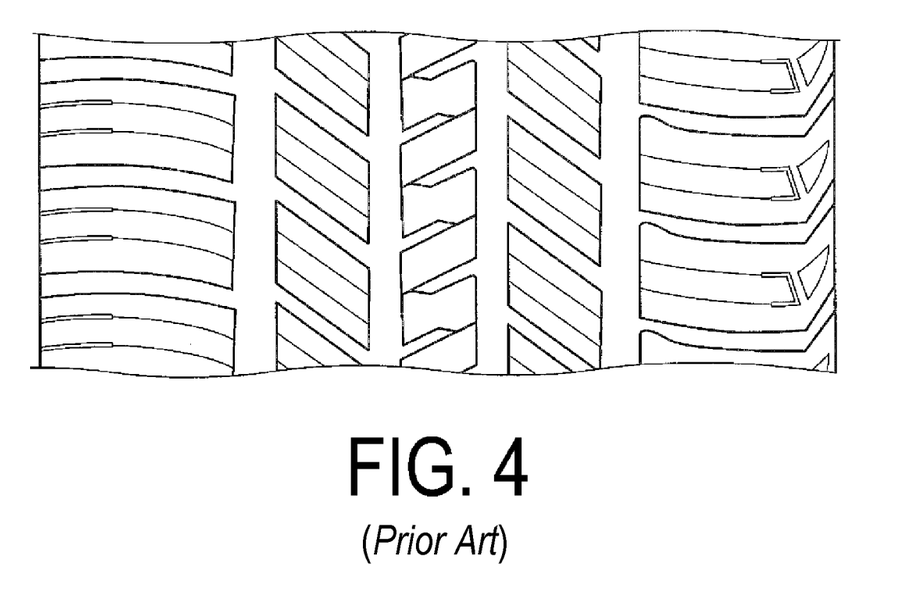
FIG. 4 is a diagram illustrating a tread pattern used in a Conventional Example.
Figure 5:
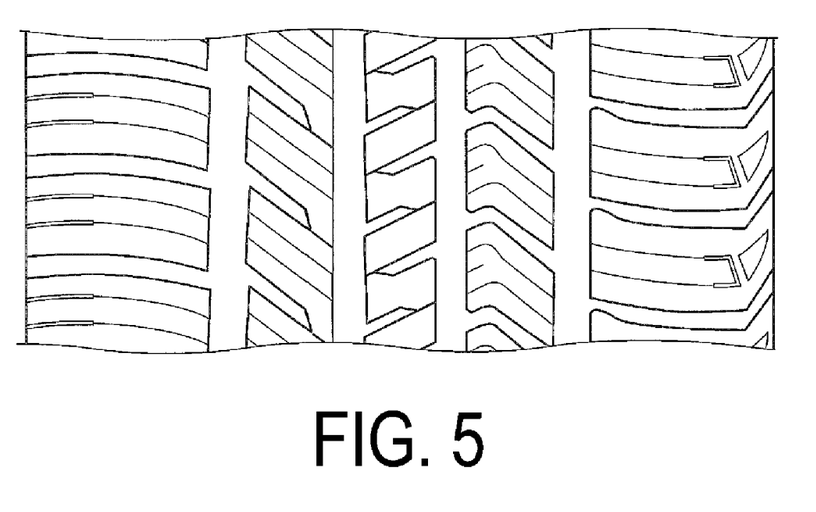
FIG. 5 is a diagram illustrating a tread pattern of an embodiment used in Comparative Examples and Examples.

FIGS. 4 and 5 are diagrams illustrating tread patterns used in the Conventional Example, the Comparative Examples 1 to 3 and the Examples 1 to 4. In Comparative Example 1 to 3 and Examples 1 to 4, the tread pattern illustrated in FIG. 5 was changed according to the specifications given in Tables 1 and 2. Unless otherwise specified in Tables 1 and 2, the groove depth, groove width, and sipe depth of the tread pattern grooves and sipes illustrated in FIGS. 4 and 5 are the same as the groove depth, groove width, and sipe depth of corresponding grooves or sipes illustrated in FIG. 2.

In Tables 1 and 2 below, a % indication such as "50% (outward), 30% (inward)" and the like in the "position of the projecting apex of the sipe turning portion 60*b*3 and the position of the terminating end of sipe 60*c*", is a % ratio obtained by dividing the distance from the center position in the tire lateral direction of the groove raised bottom portion 61*a*3 at the position in the tire lateral direction of the projecting apex of the sipe turning portion 60*b*3 and the terminating end of the sipe 60*c* by the width W in the tire lateral direction of the range of the raised bottom portion (see FIG. 3), where the "outward" means that the position of the projecting apex or the position of the terminating end is located outward in the tire lateral direction relative to the center position in the tire lateral direction of the groove raised bottom portion 61*a*3, and the "inward" means that the position is located inward in the tire lateral direction relative to the center position of the groove raised bottom portion 61*a*3 in the tire lateral direction.

TABLE 1

|  | Conventional Example | Comparative Example 1 | Comparative Example 2 | Comparative Example 3 | Example 1 |
| --- | --- | --- | --- | --- | --- |
| Basic tread pattern | FIG. 4 | FIG. 5 | FIG. 5 | FIG. 5 | FIG. 5 |
| Presence/absence of groove raised bottom portion 61a2 (Y/N) | No | Yes | Yes | No | Yes |
| Position of the projecting apex of the sipe turning portion 60a3 | No | *1 (see below) | *2 (see below) | Inward in tire lateral direction relative to position of the projecting apex of the sipe turning portion 60b3 | *3 (see below) |
| Presence/absence of sipes 60c (Y/N) | No | No | No | No | No |
| Presence/absence of region A (Y/N) | No | No | No | No | No |
| Position of the projecting apex of the sipe turning portion 60b3 and position of the terminating end of sipe 60c | — | 50% (outward), — | 50% (outward), — | — | 50% (outward), — |
| Uneven Wear Resistance | 100 | 99 | 99 | 99 | 102 |
| Braking performance on snow | 100 | 101 | 101 | 100 | 101 |
| Control performance on snow | 100 | 101 | 101 | 101 | 101 |

*1: Inward in the tire lateral direction relative to the raised bottom portion 60a3, and inward in the tire lateral direction relative to the position of the projecting apex of the sipe turning portion 60b3.

*2: Outward in the tire lateral direction relative to the raised bottom portion 60a3, and outward in the tire lateral direction relative to the position of the projecting apex of the sipe turning portion 60b3.

*3: Inward in the tire lateral direction relative to the position of the projecting apex of the sipe turning portion 60b3, within the range of the raised bottom portion 60a3.

TABLE 2

|  | Example 2 | Example 3 | Example 4 | Example 5 |
|---|---|---|---|---|
| Basic tread pattern | FIG. 5 | FIG. 5 | FIG. 5 | FIG. 2 |
| Presence/absence of groove raised bottom portion 61a2 (Y/N) | Yes | Yes | Yes | Yes |
| Position of the projecting apex of the sipe turning portion 60a3 | *3 (see above) | *3 (see above) | *3 (see above) | *3 (see above) |
| Presence/absence of sipes 60c (Y/N) | Yes | Yes | Yes | Yes |
| Presence/absence of region A (Y/N) | No | Yes | Yes | Yes |
| Position of the projecting apex of the sipe turning portion 60b3 and position of the terminating end of sipe 60c | 50% (outward), 30% (inward) | 50% (outward), 30% (inward) | 70% (outward), 30% (inward) | 50% (outward), 30% (inward) |
| Uneven Wear Resistance | 101 | 102 | 101 | 103 |
| Braking performance on snow | 103 | 108 | 108 | 108 |
| Control performance on snow | 103 | 104 | 104 | 104 |

As can be seen from the evaluation results of Comparative Examples 1 to 3 and Example 1, by making the position in the tire lateral direction of the projecting apex of the sipe turning portion 60a3 of the sipe 60a to be within the range of the raised bottom portion in the tire lateral direction in which the groove raised bottom portion 61a2 is provided, and to be inward in the tire lateral direction relative to the position in the tire lateral direction of the projecting apex of the sipe turning portion 60b3 of the sipe 60b, the uneven wear resistance and performance on snow (braking performance on snow and control performance on snow) are improved.

As can be seen from the evaluation results of Examples 2 to 5, uneven wear resistance and performance on snow (braking performance on snow and control performance on snow) are improved by:

providing a sipe 60c, providing a region A (a portion where the sipe turning portion 60a3 is curved moving away from the terminating end side of the sipe 60c) in the sipe 60a illustrated in FIG. 2, setting not only the position of the projecting apex of the sipe turning portion 60a3, but also the position of the projecting apex of the sipe turning portion 60b3 and the position of the terminating end of the sipe 60c in the tire lateral direction within the range of 60% of the width W in the tire lateral direction in the range of the raised bottom portion, and making the inner inclined portion 62a1 of the sipe 62a and the inner inclined portion 62b1 of the sipe 62b parallel to each other as illustrated in the half-tread region at the left in FIG. 2, and making the inclination angle of the inner inclined portions 62a1 and 62b1 with respect to the tire lateral direction larger than the inclination angle of the both-side inclined portions 62a2 and 62b2 with respect to the tire lateral direction.

The foregoing has been a detailed description of the pneumatic tire according to embodiments of the present technology. However, the pneumatic tire according to an embodiment of the present technology is not limited to the above embodiments or examples, and may of course be enhanced or modified in various ways within the scope of the present technology.

The invention claimed is:

1. A pneumatic tire provided with a tread pattern, the tread pattern comprising:

a pair of circumferential main grooves formed by an inner circumferential main groove and an outer circumferential main groove, the inner circumferential main groove being provided in a half-tread region on one side in a tire lateral direction with respect to a tire equator line and annularly extending in a tire circumferential direction, the outer circumferential main groove being provided outward in the tire lateral direction relative to the inner circumferential main groove and annularly extending in the tire circumferential direction, a plurality of lug grooves connecting between the pair of circumferential main grooves, and provided at intervals in the tire circumferential direction;

a plurality of block land portions defined by the pair of circumferential main grooves and the plurality of lug grooves, and a first sipe and a second sipe provided in each region of the block land portions and connecting between the pair of circumferential main grooves, each of the plurality of lug grooves comprising:

a pair of inclined groove portions that approach each other while advancing toward a first-direction in the tire circumferential direction from connection ends at which the pair of inclined groove portions connect with the pair of circumferential main grooves, and a groove turning portion that connects with ends of the pair of inclined groove portions and is bent projecting to the first-direction in the tire circumferential direction, the groove turning portion including a groove raised bottom portion that has a groove depth shallower than a groove depth of the inclined groove portions, the first sipe being located on a side of the first-direction in the tire circumferential direction relative to the second sipe, the first sipe and the second sipe each comprising:

a pair of inclined sipe portions that approach each other while advancing toward the first-direction from connection ends at which the pair of inclined sipe portions connect with the pair of circumferential main grooves, and a sipe turning portion that is bent projecting toward the first-direction and connects with ends of the pair of inclined sipe portions, and a first position in the tire lateral direction of a projecting apex of the sipe turning portion of the first sipe being positioned within a range of a raised bottom portion in the tire lateral direction in which the groove raised bottom portion is provided, and the first position being positioned further inward in the tire lateral direction relative to a second position in the tire lateral direction of a projecting apex of the sipe turning portion of the second sipe, wherein the sipe turning portion of the first sipe is non-parallel to the sipe turning portion of the second sipe, and the sipe turning portion of the first sipe includes a portion that bends or curves away from the sipe turning portion of the second sipe.

2. The pneumatic tire according to claim 1, wherein a third sipe that extends outward in the tire lateral direction from the inner circumferential main groove inclining with respect to the tire lateral direction is provided in each region of the block land portions that is sandwiched in the tire circumferential direction between the first sipe and the second sipe, the third sipe extending along to one of the inclined sipe portions of the first sipe and the second sipe that extends from the inner circumferential main groove, and the third sipe including a terminating end within a range of the raised bottom portion in the tire lateral direction.

3. The pneumatic tire according to claim 2, wherein an outer inclined sipe portion of the inclined sipe portions of the first sipe is a portion that extends in a straight line at an incline with respect to the tire lateral direction, the outer inclined sipe portion extending from the outer circumferential main groove, the third sipe does not intersect with the outer inclined sipe portion and a linear extension line that extend the outer inclined sipe portion beyond a connection end between the outer inclined sipe portion and the sipe turning portion, and the sipe turning portion connected with the outer inclined sipe portion comprises a portion that bends to a side opposite to the terminating end of the third sipe with the extension line as a boundary.

4. The pneumatic tire according to claim 2, wherein the second position of the second sipe and the third position of the terminating end of the third sipe in the tire lateral direction are positioned within a range of 60% of the width W in the tire lateral direction of the range of the raised bottom portion from a center position of the groove raised bottom portion in the tire lateral direction.

5. The pneumatic tire according to claim 1, wherein a position in the tire lateral direction of a projecting apex of the groove turning portion is inward in the tire lateral direction relative to a center line in the tire lateral direction of the block land portion.

6. The pneumatic tire according to claim 1, wherein when a half-tread region in which the inner circumferential main groove and the outer circumferential main groove are provided is referred to as a first half-tread region, the inner circumferential main groove is referred to as a first inner circumferential main groove, and the outer circumferential main groove is referred to as a first outer circumferential main groove, a second half-tread region opposite to the first half-tread region in the tire lateral direction comprises:

a second inner circumferential main groove annularly extending in the tire circumferential direction, a second outer circumferential main groove provided outward in the tire lateral direction relative to the second inner circumferential main groove, and extending annularly in the tire circumferential direction, a continuous land portion, defined by the second inner circumferential main groove and the second outer circumferential main groove, and going around an entire circumference of the pneumatic tire in the tire circumferential direction, and a fourth sipe and a fifth sipe that extend within a region of the continuous land portion inclining with respect to the tire lateral direction, and connect the second inner circumferential main groove and the second outer circumferential main groove, the fourth sipe and the fifth sipe each comprises:

an inner inclined portion provided inside the region of the continuous land portion, and both-side inclined portions provided on both sides of the inner inclined portion in the tire lateral direction and connected to both the second inner circumferential main groove and the second outer circumferential main groove, the inner inclined portion of the fourth sipe and the inner inclined portion of the fifth sipe are parallel to each other, and the inclination angle of the inner inclined portion with respect to the tire lateral direction is larger than the inclination angle of the both-side inclined portions with respect to the tire lateral direction.

7. The pneumatic tire according to claim 6, wherein the tread pattern comprises:

a center continuous land portion that goes around an entire circumference of the pneumatic tire in the tire circumferential direction, is positioned between the first inner circumferential main groove and the second inner circumferential main groove and is defined by the first inner circumferential main groove and the second inner circumferential main groove, a plurality of first center lug grooves provided at intervals in the tire circumferential direction and extending inward in the tire lateral direction from the first inner circumferential main groove and terminating in a region of the center continuous land portion, and a plurality of second center lug grooves provided at intervals in the tire circumferential direction and extending inward in the tire lateral direction from the second inner circumferential main groove and terminating in the region of the center continuous land portion, any one of the plurality of second center lug grooves is provided in a region in the tire circumferential direction between two adjacent first center lug grooves of the plurality of first center lug grooves in the tire circumferential direction, and any one of the plurality of first center lug grooves is provided in a region in the tire circumferential direction between two adjacent second center lug grooves of the plurality of second center lug grooves in the tire circumferential direction.

8. The pneumatic tire according to claim 7, wherein a maximum groove depth of the plurality of second center lug grooves is shallower than a maximum groove depth of the plurality of first center lug grooves.

9. The pneumatic tire according to claim 6, wherein the pneumatic tire is designated to cause one of both sides in the tire lateral direction being an outer side of a vehicle when mounted on the vehicle, and a side in which the first half-tread region is provided in the tire lateral direction is designated to be the outer side of the vehicle.

10. The pneumatic tire according to claim 1, wherein a maximum sipe depth of the first sipe and the second sipe is less than 90% of a groove depth of each of the inner circumferential main groove and the outer circumferential main groove.

11. The pneumatic tire according to claim 3, wherein the second position of the second sipe and the third position of the terminating end of the third sipe in the tire lateral direction are positioned within a range of 60% of the width W in the tire lateral direction of the range of the raised bottom portion from a center position of the groove raised bottom portion in the tire lateral direction.

12. The pneumatic tire according to claim 11, wherein a position in the tire lateral direction of a projecting apex of the groove turning portion is inward in the tire lateral direction relative to a center line in the tire lateral direction of the block land portion.

13. The pneumatic tire according to claim 12, wherein
when a half-tread region in which the inner circumferential main groove and the outer circumferential main groove are provided is referred to as a first half-tread region, the inner circumferential main groove is referred to as a first inner circumferential main groove, and the outer circumferential main groove is referred to as a first outer circumferential main groove,
a second half-tread region opposite to the first half-tread region in the tire lateral direction comprises,
a second inner circumferential main groove annularly extending in the tire circumferential direction,
a second outer circumferential main groove provided outward in the tire lateral direction relative to the second inner circumferential main groove, and extending annularly in the tire circumferential direction,
a continuous land portion, defined by the second inner circumferential main groove and the second outer circumferential main groove, and going around an entire circumference of the pneumatic tire in the tire circumferential direction, and
a fourth sipe and a fifth sipe that extend within a region of the continuous land portion inclining with respect to the tire lateral direction, and connect the second inner circumferential main groove and the second outer circumferential main groove,
the fourth sipe and the fifth sipe each comprises,
an inner inclined portion provided inside the region of the continuous land portion, and
both-side inclined portions provided on both sides of the inner inclined portion in the tire lateral direction and connected to both the second inner circumferential main groove and the second outer circumferential main groove,
the inner inclined portion of the fourth sipe and the inner inclined portion of the fifth sipe are parallel to each other, and
the inclination angle of the inner inclined portion with respect to the tire lateral direction is larger than the inclination angle of the both-side inclined portions with respect to the tire lateral direction.

14. The pneumatic tire according to claim 13, wherein
the tread pattern comprises:
a center continuous land portion that goes around an entire circumference of the pneumatic tire in the tire circumferential direction, is positioned between the first inner circumferential main groove and the second inner circumferential main groove and is defined by the first inner circumferential main groove and the second inner circumferential main groove,
a plurality of first center lug grooves provided at intervals in the tire circumferential direction and extending inward in the tire lateral direction from the first inner circumferential main groove and terminating within a region of the center continuous land portion, and
a plurality of second center lug grooves provided at intervals in the tire circumferential direction and extending inward in the tire lateral direction from the second inner circumferential main groove and terminating in a region of the center continuous land portion,
any one of the plurality of second center lug grooves is provided in a region in the tire circumferential direction between two adjacent first center lug grooves of the plurality of first center lug grooves in the tire circumferential direction, and
any one of the plurality of first center lug grooves is provided in a region in the tire circumferential direction between two adjacent second center lug grooves of the plurality of second center lug grooves in the tire circumferential direction.

15. The pneumatic tire according to claim 14, wherein a maximum groove depth of the plurality of second center lug grooves is shallower than a maximum groove depth of the plurality of first center lug grooves.

16. The pneumatic tire according to claim 15, wherein
the pneumatic tire is designated to cause one of both sides in the tire lateral direction being an outer side of a vehicle when mounted on the vehicle, and
a side in which the first half-tread region is provided in the tire lateral direction is designated to be the outer side of the vehicle.

17. The pneumatic tire according to claim 16, wherein a maximum sipe depth of the first sipe and the second sipe is less than 90% of a groove depth of each of the inner circumferential main groove and the outer circumferential main groove.

18. The pneumatic tire according to claim 1, wherein
when a half-tread region in which the inner circumferential main groove and the outer circumferential main groove are provided is referred to as a first half-tread region, the inner circumferential main groove is referred to as a first inner circumferential main groove, and the outer circumferential main groove is referred to as a first outer circumferential main groove,
a second half-tread region opposite to the first half-tread region in the tire lateral direction comprises:
a second inner circumferential main groove annularly extending in the tire circumferential direction, and
a second outer circumferential main groove provided outward in the tire lateral direction relative to the second inner circumferential main groove, and extending annularly in the tire circumferential direction, and the tread pattern comprises:
a center continuous land portion that goes around an entire circumference of the pneumatic tire in the tire circumferential direction, is positioned between the first inner circumferential main groove and the second inner circumferential main groove and is defined by the first inner circumferential main groove and the second inner circumferential main groove.

19. A pneumatic tire provided with a tread pattern, the tread pattern comprising:
a pair of circumferential main grooves formed by an inner circumferential main groove and an outer circumferential main groove, the inner circumferential main groove being provided in a half-tread region on one side in a tire lateral direction with respect to a tire equator line and annularly extending in a tire circumferential direction, the outer circumferential main groove being provided outward in the tire lateral direction relative to the inner circumferential main groove and annularly extending in the tire circumferential direction, a plurality of lug grooves connecting between the pair of circumferential main grooves, and provided at intervals in the tire circumferential direction;

a plurality of block land portions defined by the pair of circumferential main grooves and the plurality of lug grooves, and a first sipe and a second sipe provided in each region of the block land portions and connecting between the pair of circumferential main grooves, each of the plurality of lug grooves comprising:

a pair of inclined groove portions that approach each other while advancing toward a first-direction in the tire circumferential direction from connection ends at which the pair of inclined groove portions connect with the pair of circumferential main grooves, and a groove turning portion that connects with ends of the pair of inclined groove portions and is bent projecting to the first-direction in the tire circumferential direction, the groove turning portion including a groove raised bottom portion that has a groove depth shallower than a groove depth of the inclined groove portions, the first sipe being located on a side of the first-direction in the tire circumferential direction relative to the second sipe, the first sipe and the second sipe each comprising:

a pair of inclined sipe portions that approach each other while advancing toward the first-direction from connection ends at which the pair of inclined sipe portions connect with the pair of circumferential main grooves, and a sipe turning portion that is bent projecting toward the first-direction and connects with ends of the pair of inclined sipe portions, and a first position in the tire lateral direction of a projecting apex of the sipe turning portion of the first sipe being positioned within a range of a raised bottom portion in the tire lateral direction in which the groove raised bottom portion is provided, and the first position being positioned further inward in the tire lateral direction relative to a second position in the tire lateral direction of a projecting apex of the sipe turning portion of the second sipe, wherein a third sipe that extends outward in the tire lateral direction from the inner circumferential main groove inclining with respect to the tire lateral direction is provided in each region of the block land portions that is sandwiched in the tire circumferential direction between the first sipe and the second sipe, the third sipe extending along to one of the inclined sipe portions of the first sipe and the second sipe that extends from the inner circumferential main groove, and the third sipe including a terminating end within a range of the raised bottom portion in the tire lateral direction.

20. A pneumatic tire provided with a tread pattern, the tread pattern comprising:

a pair of circumferential main grooves formed by an inner circumferential main groove and an outer circumferential main groove, the inner circumferential main groove being provided in a half-tread region on one side in a tire lateral direction with respect to a tire equator line and annularly extending in a tire circumferential direction, the outer circumferential main groove being provided outward in the tire lateral direction relative to the inner circumferential main groove and annularly extending in the tire circumferential direction, a plurality of lug grooves connecting between the pair of circumferential main grooves, and provided at intervals in the tire circumferential direction;

a plurality of block land portions defined by the pair of circumferential main grooves and the plurality of lug grooves, and a first sipe and a second sipe provided in each region of the block land portions and connecting between the pair of circumferential main grooves, each of the plurality of lug grooves comprising:

a pair of inclined groove portions that approach each other while advancing toward a first-direction in the tire circumferential direction from connection ends at which the pair of inclined groove portions connect with the pair of circumferential main grooves, and a groove turning portion that connects with ends of the pair of inclined groove portions and is bent projecting to the first-direction in the tire circumferential direction, the groove turning portion including a groove raised bottom portion that has a groove depth shallower than a groove depth of the inclined groove portions, the first sipe being located on a side of the first-direction in the tire circumferential direction relative to the second sipe, the first sipe and the second sipe each comprising:

a pair of inclined sipe portions that approach each other while advancing toward the first-direction from connection ends at which the pair of inclined sipe portions connect with the pair of circumferential main grooves, and a sipe turning portion that is bent projecting toward the first-direction and connects with ends of the pair of inclined sipe portions, and a first position in the tire lateral direction of a projecting apex of the sipe turning portion of the first sipe being positioned within a range of a raised bottom portion in the tire lateral direction in which the groove raised bottom portion is provided, and the first position being positioned further inward in the tire lateral direction relative to a second position in the tire lateral direction of a projecting apex of the sipe turning portion of the second sipe, wherein when a half-tread region in which the inner circumferential main groove and the outer circumferential main groove are provided is referred to as a first half-tread region, the inner circumferential main groove is referred to as a first inner circumferential main groove, and the outer circumferential main groove is referred to as a first outer circumferential main groove, a second half-tread region opposite to the first half-tread region in the tire lateral direction comprises:

a second inner circumferential main groove annularly extending in the tire circumferential direction, a second outer circumferential main groove provided outward in the tire lateral direction relative to the second inner circumferential main groove, and extending annularly in the tire circumferential direction, a continuous land portion, defined by the second inner circumferential main groove and the second outer circumferential main groove, and going around an entire circumference of the pneumatic tire in the tire circumferential direction, and a fourth sipe and a fifth sipe that extend within a region of the continuous land portion inclining with respect to the tire lateral direction, and connect the second inner circumferential main groove and the second outer circumferential main groove, the fourth sipe and the fifth sipe each comprises:
- an inner inclined portion provided inside the region of the continuous land portion, and
- both-side inclined portions provided on both sides of the inner inclined portion in the tire lateral direction and connected to both the second inner circumferential main groove and the second outer circumferential main groove,
- the inner inclined portion of the fourth sipe and the inner inclined portion of the fifth sipe are parallel to each other, and the inclination angle of the inner inclined portion with respect to the tire lateral direction is larger than the inclination angle of the both-side inclined portions with respect to the tire lateral direction.

* * * * *